United States Patent [19]

Roddy et al.

[11] 4,170,057
[45] Oct. 9, 1979

[54] METHOD OF MAKING A DYNAMOELECTRIC MACHINE

[75] Inventors: Joseph T. Roddy, Ballwin; William R. Butler, Fenton, both of Mo.

[73] Assignee: Emerson Electric Co., St. Louis, Mo.

[21] Appl. No.: 780,228

[22] Filed: Mar. 22, 1977

[51] Int. Cl.² ............................................ H02K 15/14
[52] U.S. Cl. ...................................... 29/596; 310/42; 310/89; 310/90
[58] Field of Search ................... 29/596, 598; 310/42, 310/89, 90

[56] References Cited

U.S. PATENT DOCUMENTS

| | | | |
|---|---|---|---|
| 2,423,750 | 7/1947 | Benson | 29/596 |
| 3,176,172 | 3/1965 | Thompson et al. | 310/42 |
| 3,320,660 | 5/1967 | Otto | 29/596 |
| 3,437,853 | 4/1969 | Arnold | 29/596 |
| 3,707,037 | 12/1972 | Gutris | 29/596 |
| 3,966,278 | 6/1976 | Lewis | 308/72 |

Primary Examiner—Carl E. Hall
Attorney, Agent, or Firm—Polster, Polster and Lucchesi

[57] ABSTRACT

An electric motor in which concentricity between stator and rotor is maintained solely by frictional forces between radial faces of the motor's end shields and radial faces of the stator. The motor is assembled by positioning the rotor in the stator by shims in the air gap. End shields are mounted on the rotor shaft, with radial portions of the end shield in face-to-face abutment with a face of the stator. Short through-bolts extending through the radial faces of the end shields and through the stator are tightened sufficiently to maintain the air gap between stator and rotor during shipment and use of the motor. Self-aligning bearings compensate for any lack of squareness between the stator's bore and its end faces. Special patterns on the end shield faces abutting the stator facilitate repair and reassembly of the motor.

11 Claims, 4 Drawing Figures

METHOD OF MAKING A DYNAMOELECTRIC MACHINE

BACKGROUND OF THE INVENTION

Conventionally, fractional horsepower electric motors have been made with a stator shell and two end shields, with rabbets machined in them to insure proper cover-fit, i.e. concentricity of the central bore of the stator and the bearings carried by the end shields. Such a construction is expensive, because of the machining step, and, in large scale production, requires the provision of a relatively wide annular air gap between the stator and the rotor, because the location of the rotor with respect to the stator is determined by the relation of the shell and end shield rabbets rather than by the relation of the stator and the rotor. On the other hand, such a construction has the advantage of providing a motor which can be disassembled and reassembled readily, to permit repair and replacement of elements of the motor.

Recently, motors have been produced commercially by cementing end shields to the stator core while maintaining the desired air gap spacing with shims, which, after the cementing has been accomplished, are removed. An illustrative example of such a method is described in Thompson and Wightman U.S. Pat. No. 3,165,816, and a resulting motor is described in Thompson and Wightman U.S. Pat. No. 3,176,172. This method permits the commercial production of cheap motors with a small, uniform air gap between the stator and rotor. Such motors suffer from the disadvantages, however, that if the parts are not properly prepared, or if the adhesive application and curing steps are not properly carried out, the motors can debond upon impact in transit or vibration in use; if properly assembled, they can not economically be disassembled once the cement is cured. Accordingly, defects which could readily be cured in a conventionally constructed motor require that the entire motor be scrapped in the case of a cemented motor.

A motor having the excellent concentricity of stator and rotor of a cemented motor and the repairability of a conventional electric motor is described in Arnold U.S. Pat. No. 3,437,853. In this motor, a bridge of cured adhesive material is adhered to either the stator or end shield and is free from adhesion to the other part, the adhesive material constituting the sole radial locating means between the stator and the end shield. The bridge of adhesive is formed while the rotor and stator are held concentrically by shims in the air gap between them. The end shields are held axially in place by conventional through-bolts. Unfortunately, this construction has proven even more subject to misalignments caused by impact than the fully cemented motor. Its assembly also requires both a cementing operation and a bolting operation, and is thus somewhat more complex than that of a fully cemented motor.

SUMMARY OF THE INVENTION

One of the objects of this invention is to provide a dynamo-electric machine which combines the advantages of concentricity and narrow air gap of the cemented machine with the ease of assembly and reassembly of the conventional machine, yet which is simpler to construct than either of them.

Another object is to provide such a machine which will withstand the rigors of shipment and use.

Other objects will become apparent to those skilled in the art in light of the following description and accompanying drawings.

In accordance with one aspect of this invention, generally stated, a dynamoelectric machine is provided in which a pair of end shields are held frictionally with respect to a stator by tension elements, the tension elements being the sole means for preventing both axial and radial movement of the end shields with respect to the stator. In the preferred embodiment, the tension elements are short through-bolts extending through axial apertures in the stator and in the end shields. The term "aperture" is used herein to include both holes and grooves, although the stator and end shields must sufficiently surround the through-bolts to prevent distortion of the end shields when the through-bolts are tightened. Self-aligning bearings in the end shields support the rotor of the dynamoelectric machine. The term "end shield" is used broadly herein to include any structure which holds the rotor bearing, whether or not it performs a shielding function. The preferred end shields include radially outwardly turned foot portions, and the through-bolts extend through these portions and engage axially outward radial faces of them. The axially inward faces of the turned portions frictionally engage the axially outer radial faces of the stator core. A different pattern is provided on each axially inward end shield face.

In the process of manufacturing such a machine, the rotor and stator of the machine are held in their desired positions by means such as shims in the air gap. The end shields are positioned on the rotor shaft and the through-bolts are tightened sufficiently to prevent radial movement of the end shields with respect to the stator. The through-bolts are torqued down to at least about 75 lb. inches, corresponding to an axial tension of at least about 1500 lbs. The preferred range of axial tension is about 1700 to about 2500 lbs. The pattern on each axially inward end shield face cuts into the varnish of the stator core. The motor is easily disassembled for repair or replacement of one of the parts. Upon reassembly, the simple expedient of rotating the end shields with respect to their original position ensures that they do not simply slip back into the patterns they originally cut in the stator varnish, and thus ensures that reassembly by the same method as the original assembly will provide the same benefits.

DESCRIPTION OF THE PREFERRED EMBODIMENT

Figure 4:
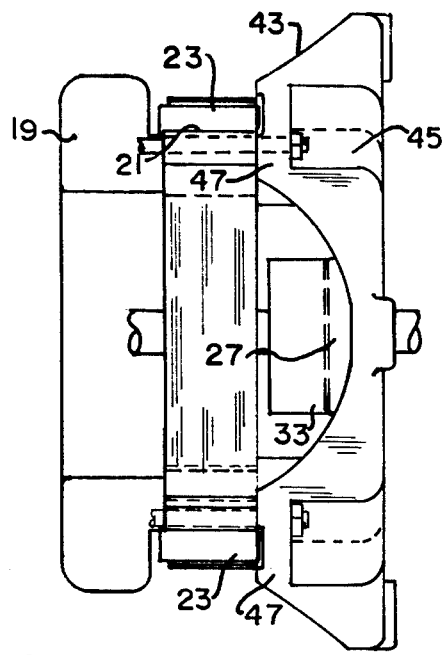
FIG. 4 is a fragmentary view in side elevation of the machine of FIGS. 1 and 2.
Figure 1:
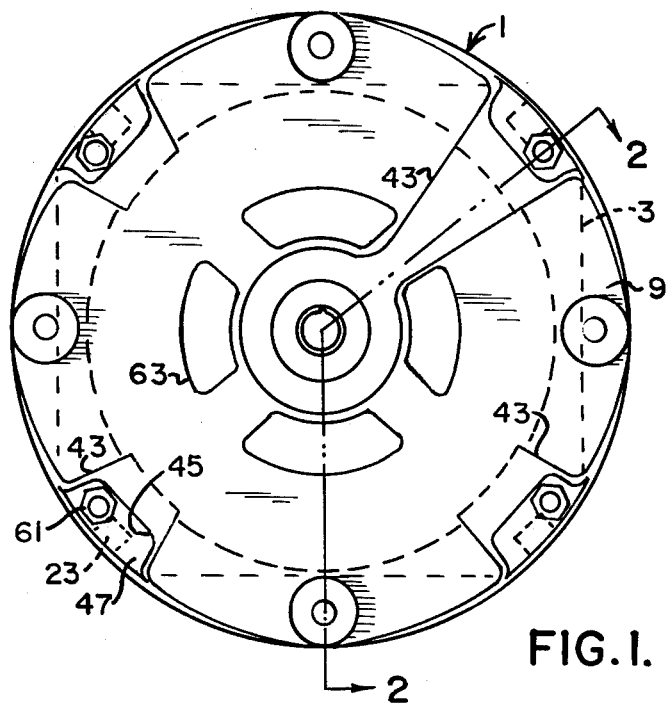
FIG. 1 is a view in end elevation of one illustrative embodiment of dynamoelectric machine of this invention.
Figure 2:
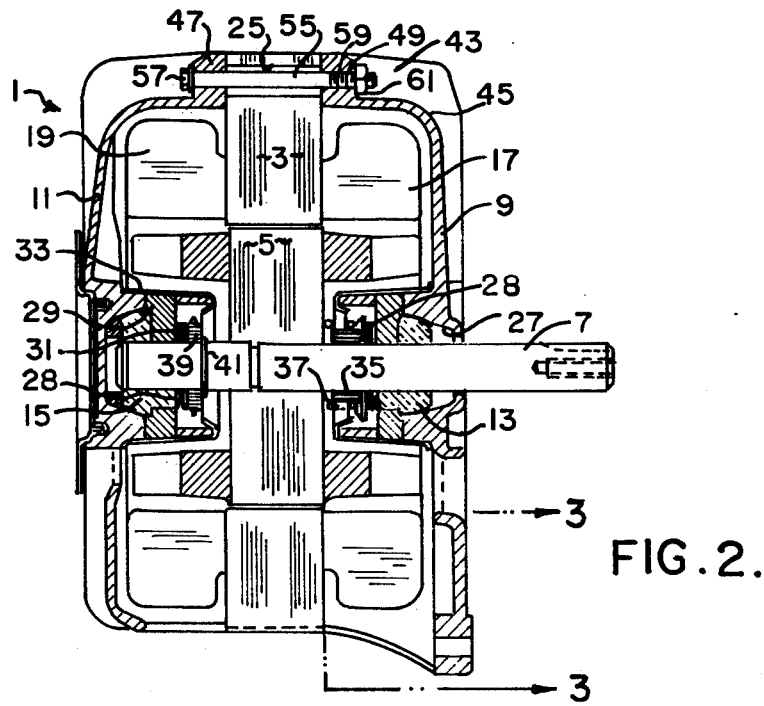
FIG. 2 is a sectional view taken along the line 2—2 of FIG. 1.

Referring now to the drawings, reference numeral 1 indicates one illustrative embodiment of dynamoelectric machine of this invention. The machine 1 is a fractional horsepower motor including a stator 3, a rotor 5 including the usual rotor shaft 7, end shields 9 and 11, and self-aligning bearings 13 and 15. In this embodiment, the stator 3 is a slab-sided "square" stator core made of about forty-eight 0.022" steel laminations with end turns 17 and 19 projecting axially from the stator core. The stator core has four axially extending grooves 21 in its corners. The grooves 21 carry cleats 23 which hold the laminations of the stator core together. The stator core has four axially extending through-bolt holes 25 running through it adjacent the grooves 21.

Each of the end shields 9 and 11 is an aluminum casting having a central seat 27 for the spherical self-aligning bearings 13 and 15 respectively. The bearing assemblies further include retainer spring plates 28, wicking 29, washers 31 and wicking retainer caps 33. The spring clip 28 may, for example, be similar to the type shown in Lewis, U.S. Pat. No. 3,966,278. A thrust sleeve 35 and coil spring 37 associated with the first self-aligning bearing 13, and a thrust sleeve 39 and snap ring 41 associated with the second self-aligning bearing 15 provide axial positioning of the rotor 5.

Figure 3:
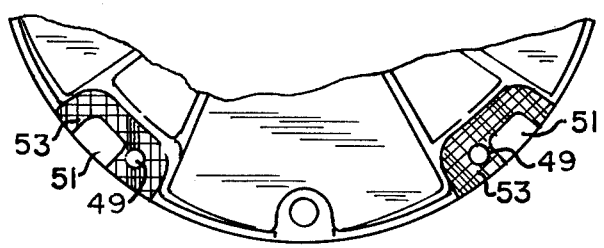
FIG. 3 is a fragmentary sectional view taken along the line 3—3 of FIG. 2, showing an axially inner face of one end shield.

Each of the end shields includes four axially extending leg portions 43, each including an axially extending, radially recessed wall 45 and a radially extending foot portion 47. Each foot portion 47 includes a through-bolt hole 49 corresponding to a hole 25 in the stator core. The axially inward radial face of each foot portion 47 includes a cut-out 51 to accommodate the end of the cleat 23. As shown in FIG. 3, the axially inward face of each foot portion 47 also includes a pattern of slightly raised intersecting ribs 53 irregularly spaced from each other. The pattern on each foot portion 47 differs from the pattern on the others, for reasons set out hereinafter.

Through-bolts 55 extending through the holes 25 and 49 in the stator and end shields include a head portion 57, a threaded shank portion 59, and a nut 61. The through-bolts 55 may be two inch "Grade 5" bolts having a tensile strength on the order of 120,000 lbs. per square inch. The end shield holes 49 are only large enough to accommodate the bolts 55, but the stator holes 25 are substantially larger than the through-bolts 55. Nuts 61 on the threaded portions 59 hold the end shields 9 and 11 to the stator core 3 with the axially inward faces of the foot portions 47 held tightly to the radial faces of the stator core. The bolts 55 are the sole means for holding the end shields both axially and radially with respect to the stator. The foot portions 49 have a relatively small axial dimension, so that the effective length of the through-bolts, between the head 57 and nut 61, is less than twice the axial dimension of the stator core, and preferably less than an inch longer than the axial dimension of the stator core.

In the manufacture of the illustrative dynamoelectric machine 1, the stator core 3 is assembled and held together by cleats 23. The core is then dipped in varnish, baked and wound, all in accordance with standard practice.

The rotor 5 is spaced within the bore of the stator bore by means of shims or spacers, placed in the annular air gap between the stator and the rotor. The end shields are then put in place with the shaft 7 projecting into or through the bearings 13 and 15. The through-bolts 55 are inserted in the stator, to locate the end shields circumferentially with respect to the stator. The shimmed rotor and the bearings 13 and 15 locate the end shield radially with respect to the stator core 3. Squareness between the stator's axially outer faces and the stator bore need not be maintained to the close tolerances required for a hermetic motor, for example, because the self-aligning bearings 13 and 15 prevent binding even when the end shields are slightly cocked with respect to the stator bore.

The through-bolts are torqued down with a torquing force of 100 lb. inches, corresponding to a bolt tension of 2,000 pounds. This produces a sufficient frictional force between the axially inward faces of the foot portions 49 of the end shields and the axially outer radial faces of the stator core to prevent any slippage of the end shields with respect to the stator core, even under considerably greater mechanical shock and vibration than the motor encounters during shipping and operation.

The shims are then removed through ventilation openings 63 in the end shield 9.

The motor is then tested, and if some defect is detected, such as a defective bearing or a short circuit in the stator winding, the motor can be disassembled, the defect cured, and the motor reassembled in the foregoing manner. Should a defect develop after the motor has been put in use, the motor can be disassembled and reassembled in the same manner. If the varnish on the exterior surface of the stator core is sufficiently thick, the waffle pattern 53 on the end shield feet 49 will have cut through the varnish, thus preventing the varnish from causing the bolts to lose torque by a gradual flow out from between the abutting surfaces of the stator and end shield. Because the waffle pattern is different on each foot, the pattern it cuts in the varnish will not locate the end shield with respect to the stator, if the end shield is rotated 90°, 180° or 270° from its original position. Therefore, even if some of the parts are replaced, when the parts are reassembled in the foregoing manner the end shields will remain in the position established by the shims, rather than falling back into the old location cut by the patterns. The patterns are also chosen to be small with respect to the amount of play provided by the axial holes 25 in the stator. Therefore, even if such components as switches, mounting pads, and electrical leads do not permit the end shields to be turned a full 90°, turning them 1° or 2° will prevent any part of the patterns from slipping back into the old location cut by the pattern.

Numerous variations in the dynamoelectric machine and method of constructing it of this invention will occur to those skilled in the art in light of the foregoing disclosure. For example, although it is preferred to cleat the stator core to provide sufficient stability for easy winding of the field coils, the stator laminations may be held together entirely by the through-bolts. The waffle pattern on the foot portions of the end shields may be omitted if the varnish coat on the stator is relatively thin. The patterns may be identical, particularly if the motor design does not permit turning the end shields. Other self-aligning bearings than the spherical bearings illustrated may be used. These variations are merely illustrative.

We claim:

1. In the process of manufacturing a dynamoelectric machine having a stator including a stator core composed of a plurality of laminations, a rotor, an annular air gap between the stator core and rotor, a rotor shaft, a pair of end shields carrying rotor shaft journaling bearings, and a plurality of tension elements for holding the end shields axially to said stator, said process including a step of assembling said rotor and said stator with said rotor and said stator core aligned by temporary means for establishing a uniform annular air gap between them, a step of attaching said end shields by positioning said end shields with at least one radial face of each end shield engaging a radial face of said stator and with said rotor shaft extending into said bearings to position said end shields radially with respect to said stator and tightening said tension elements, and thereafter a step of removing said temporary means to produce a mechanically finished motor for use, the improvement wherein said bearings are self-aligning bearings, and wherein said tension elements are tightened sufficiently that radial movement of said end shields with respect to said stator is prevented solely by frictional forces between said radial faces of said end shields and said radial faces of said stator core in the use of said motor after said temporary means are removed.

2. The improvement of claim 1 wherein said bearings are spherical self-aligning bearings.

3. The improvement of claim 1 wherein said tension elements are tightened to an axial tension of at least 1500 pounds.

4. The improvement of claim 1 wherein said tension elements are through-bolts extending axially through said stator and said end shields.

5. The improvement of claim 4 wherein said through-bolts are tightened to a torque of at least 75 inch pounds.

6. The improvement of claim 1 wherein said end shields comprise a plurality of radially extending foot portions having axially inner and axially outer radial surfaces, and wherein said tension elements engage said outer surfaces of said foot portions and hold said inner surfaces of said foot portions against axially outer radial faces of said laminated stator core.

7. The improvement of claim 6 including a coating of varnish on said stator core, and wherein said axially inner surfaces of said foot portions include patterns thereon, said patterns cutting into said varnish.

8. The improvement of claim 7 wherein at least two of said patterns are different, whereby in a subsequent step of disassembling said end shields from said stator core and reassembling said end shields in a different rotational position said axially inner faces of said foot portions again cut into said varnish rather than fitting into the patterns previously cut into said varnish.

9. The improvement of claim 6 wherein the distance between said axially outer surfaces of said foot portions is less than twice the axial dimension of said stator core.

10. The improvement of claim 9 wherein the distance between said axially outer surfaces of said foot portions is no more than one inch greater than the axial dimension of said stator core.

11. The improvement of claim 1 wherein neither of said end shields includes a part in axial coextension with said stator.

* * * * *